United States Patent

McGrath et al.

[11] Patent Number: 5,457,147
[45] Date of Patent: Oct. 10, 1995

[54] CONTROLLED FUNCTIONAL DENSITY POLY (SECONDARY AMINES) AND METHOD FOR PREPARATION THEREOF

[75] Inventors: Martin P. McGrath, Chesterfield; Samuel J. Tremont, Manchester, both of Mo.

[73] Assignee: Monsato Company, St. Louis, Mo.

[21] Appl. No.: 383,046

[22] Filed: Feb. 3, 1995

Related U.S. Application Data

[62] Division of Ser. No. 234,500, Apr. 28, 1994, which is a continuation of Ser. No. 990,315, Dec. 14, 1992, abandoned.

[51] Int. Cl.[6] ........................................ C08K 3/02
[52] U.S. Cl. .................. 524/701; 525/55; 525/86; 525/157; 525/220; 525/240; 525/241; 525/250; 525/251; 525/328.7; 525/331.9; 525/337; 528/230; 528/239; 528/241; 528/246; 528/266; 528/269; 524/714; 524/785; 524/849; 524/877
[58] Field of Search .................. 525/55, 86, 157, 525/220, 240, 241, 250, 251, 328.7, 331.9, 337; 528/230, 239, 241, 246, 266, 269; 524/701, 714, 785, 849, 877

[56] References Cited

U.S. PATENT DOCUMENTS

| | | | |
|---|---|---|---|
| 3,383,426 | 5/1968 | Cull et al. | 568/852 |
| 4,068,056 | 1/1978 | Engel et al. | 526/49 |
| 4,292,242 | 9/1981 | Laine | 564/467 |
| 4,297,481 | 10/1981 | Jachimowicz et al. | 529/392 |
| 4,312,965 | 1/1982 | Jachimowicz et al. | 525/378 |
| 4,503,217 | 3/1985 | Alexander | 528/392 |
| 4,526,936 | 7/1985 | Jachimowicz et al. | 525/333.2 |
| 4,543,411 | 9/1985 | Knifton et al. | 564/467 |
| 4,558,101 | 12/1985 | Jachimowicz et al. | 525/333.2 |
| 4,657,984 | 4/1987 | McEntire et al. | 525/340 |
| 4,705,898 | 11/1987 | McEntire | 564/467 |
| 4,794,199 | 12/1988 | Lin et al. | 564/485 |
| 5,049,625 | 9/1991 | Tazuma et al. | 525/391 |
| 5,134,200 | 7/1992 | Wideman | 525/332.8 |

Primary Examiner—Samuel A. Acquah
Attorney, Agent, or Firm—Kenneth D. Goetz; Paul L. Passley; James C. Bolding

[57] ABSTRACT

A process for preparing a controlled functional density poly(secondary amine) comprising: (a) contacting a polymer containing olefinic unsaturation with carbon monoxide in hydrogen under hydroformylation conditions in the presence of a hydroformylation catalyst to produce a controlled functional density polyaldehyde containing reactive carbon-carbon double bonds, and (b) contacting the polyaldehyde with hydrogen and a primary amine under reductive amination conditions in the presence of a ruthenium-containing imine hydrogenation catalyst or (b[1]) contacting the polyaldehyde with a sterically hindered aliphatic or cycloaliphatic primary amine or an aromatic primary amine under reductive amination conditions in the presence of an alkali metal borohydride to produce poly(secondary amine) having a substantially equivalent ratio of secondary amine groups to reactive carbon-carbon double bonds as the ratio of aldehyde groups to reactive carbon-carbon double bonds in the polyaldehyde.

7 Claims, No Drawings

CONTROLLED FUNCTIONAL DENSITY POLY (SECONDARY AMINES) AND METHOD FOR PREPARATION THEREOF

This application is a Divisional of U.S. Ser. No. 08/234,500 filed Apr. 28, 1994, now allowed, which is a Continuation of U.S. Ser. No. 07/990,315 filed Dec. 14, 1992, now abandoned.

BACKGROUND OF THE INVENTION

This invention relates to controlled functional density poly(secondary amines) containing olefinic unsaturation. In one aspect, this invention relates to the production of controlled functional density poly(secondary amines) containing olefinic unsaturation by selective reaction of carbon-carbon double bonds in the starting polymer containing olefinic unsaturation.

The principle of preparing amines by reacting an olefin with hydrogen, carbon monoxide and a primary or secondary amine is known. Various techniques embodying this principle have been described using various catalysts. Such techniques are generally referred to as aminomethylation reactions.

In J. Org. Chem., 47, 445 (1982), Jachimowicz et al disclose various approaches which have been used in attempts to devise a one-step, efficient and general conversion of olefins to amines. Among the catalysts are iron pentacarbonyl, rhodium oxide, ruthenium/iron carbonyl and iridium catalysts.

U.S. Pat. No. 4,297,481 discloses a process for forming a polymeric polyamine/amide wherein said amino/amido nitrogens are positioned in the polymer backbone by contacting a monomeric nitrogen compound which has at least two labile hydrogens bonded to the nitrogen atoms therein, a monomeric hydrocarbon compound containing at least two olefinic groups therein, carbon monoxide and water in the presence of a catalytic amount of a rhodium-containing compound. This invention describes the use of ammonia or primary amines but does not produce polymers with exclusively pendant secondary amine groups. The preparation of polymers with pendant amine and amide groups is described in U.S. Pat. No. 4,312,965. These polymers are prepared from polymeric polyolefins, carbon monoxide, water and nitrogen compounds such as ammonia and primary or secondary amines. Again, rhodium or a rhodium-containing compound serves as the catalyst. However, this invention describes polymers having a low degree of amine incorporation which predominantly contain tertiary amine groups when primary amines are used as the starting material.

U.S. Pat. No. 4,503,217 teaches a process for preparing polymeric polyamines from polybutadiene, ammonia and primary or secondary amines, carbon monoxide and hydrogen in the presence of a catalyst system comprising a ruthenium-containing catalyst and a dimethylformamide solvent which provides a two-phase liquid product, allowing for easy separation of the product polyamine. When primary amines are used in this invention, only the vinyl groups are functionalized, the yield for the amine containing polymers are low, and the resulting polymers are insoluble in organic solvents.

U.S. Pat. No. 4,657,984 discloses preparation of polymeric poly(tertiary amines) from carbon monoxide, hydrogen, polymeric olefins and secondary amines utilizing ruthenium or rhodium phosphines as catalysts. It is states that use of these particular catalysts facilitates reaction and hence functionalization of internal as well as vinyl olefin groups.

Thus, the state of the art for preparing polymeric secondary and tertiary polyamines teaches an aminomethylation reaction wherein the vinylic olefins and internal olefins can be reacted utilizing various catalysts under a variety of conditions. However, these reactions are significantly different than the reaction sequence of hydroformylation and reductive amination because there is no teaching in the aminomethylation prior art regarding how to control the degree of functionalization, i.e., the functional density, of either the polyaldehyde or the polyamine prepared therefrom.

A process which produces controlled functional density poly(secondary amines) containing residual reactive carbon-carbon double bonds which uses milder reaction conditions, results in higher functional density polymers which contain essentially no tertiary amine groups rather than a mixture of secondary and tertiary amine groups, and produces polymers which are soluble in organic solvents would be highly desirable.

The poly(secondary amines) produced by the process of the present invention are useful in rubber chemicals, such as polymer bound cure accelerators which do not release hazardous volatile materials during curing, polymeric co-activators which cannot migrate from one component to another and polymer bound antioxidants and/or antiozonants with significantly lower tendency to leach out of rubber products, e.g., tires. The poly(secondary amines) produced by the process of the present invention are also useful in urethane/urea materials, coatings, adhesives, sealants and construction of three dimensional networks through bonds not available to tertiary amines.

SUMMARY OF THE INVENTION

It is an object of the invention to provide a process for preparing controlled functional density poly(secondary amines) containing olefinic unsaturation. It is a further object of the invention to provide an efficient and commercially viable process for preparing controlled functional density poly(secondary amines) containing residual reactive carbon-carbon double bonds which uses mild reaction conditions, which results in higher functional density polymers which contain essentially no tertiary amine groups and are soluble in organic solvents. It is a still further object of the invention to provide a process for preparing controlled functional density poly(secondary amines) for use in rubber chemical applications such as cure accelerators, polymeric co-activators and antioxidants/antiozonants.

According to the invention, a process for preparing a controlled functional density poly(secondary amine) is provided which comprises: (a) contacting a polymer containing olefinic unsaturation with carbon monoxide and hydrogen under hydroformylation conditions in the presence of a hydroformylation catalyst to produce a controlled functional density polyaldehyde containing reactive carbon-carbon double bonds, and (b) contacting the polyaldehyde with hydrogen and a primary amine under reductive amination conditions in the presence of a ruthenium-containing imine hydrogenation catalyst to produce the poly(secondary amine) having a substantially equivalent ratio of secondary amine groups to reactive carbon-carbon double bonds as the ratio of aldehyde groups to reactive carbon-carbon double bonds in the polyaldehyde. In one embodiment, the reductive amination is conducted in the presence of carbon monoxide. In another embodiment, the polyaldehyde is recovered prior to the reductive amination. In a further embodiment, the functional density of the polyaldehyde is controlled by controlling the consumption of carbon monoxide and hydrogen during the hydroformylation.

Further according to the invention, a process for preparing a controlled functional density poly(secondary amine) is provided which comprises: (a) contacting a polymer containing olefinic unsaturation with carbon monoxide and hydrogen under hydroformylation conditions in the presence of a hydroformylation catalyst to produce a controlled functional density polyaldehyde containing reactive carbon-carbon double bonds, and (b) contacting the polyaldehyde with a substituted or unsubstituted sterically hindered aliphatic or cycloaliphatic primary amine or a substituted or unsubstituted aromatic primary amine under reductive amination conditions in the presence of an alkali metal borohydride to produce the poly(secondary amine) having a substantially equivalent ratio of secondary amine groups to reactive carbon-carbon double bonds as the ratio of aldehyde groups to reactive carbon-carbon double bonds in the polyaldehyde. In one embodiment, the polyaldehyde is recovered prior to the reductive amination. In another embodiment, the functional density of the polyaldehyde is controlled by controlling the consumption of carbon monoxide and hydrogen during the hydroformylation.

Still further according to the invention, a poly(secondary amine) is provided which comprises repeating units derived from the repeating unit of a polymer containing olefinic unsaturation having reactive carbon-carbon double bonds, and repeating units derived from the repeating unit of the same polymer containing olefinic unsaturation which has been hydroformylated and reductively aminated wherein the functional density of the poly(secondary amine) is about 1 to about 90 mole percent.

DETAILED DESCRIPTION OF THE INVENTION

A first embodiment of the invention relates to a process for preparing a controlled functional density poly(secondary amine) comprising: (a) contacting a polymer containing olefinic unsaturation with carbon monoxide and hydrogen under hydroformylation conditions in the presence of a hydroformylation catalyst to produce a controlled functional density polyaldehyde containing reactive carbon-carbon double bonds, and (b) contacting the polyaldehyde with hydrogen and a primary amine under reductive amination conditions in the presence of a ruthenium-containing imine hydrogenation catalyst to produce the poly(secondary amine) having a substantially equivalent ratio of secondary amine groups to reactive carbon-carbon double bonds as the ratio of aldehyde groups to reactive carbon-carbon double bonds in the polyaldehyde.

According to the process of the first embodiment of the invention, the polyaldehyde can optionally be recovered prior to the reductive amination. In addition, the reductive amination can optionally be conducted in the presence of carbon monoxide. When carbon monoxide is present during the reductive amination, the molar ratio of carbon monoxide to hydrogen is less than about 0.15:1, preferably less than about 0.1:1, and most preferably less than about 0.05:1.

A second embodiment of the invention relates to a process for preparing a controlled functional density poly(secondary amine) comprising: (a) contacting a polymer containing olefinic unsaturation with carbon monoxide and hydrogen under hydroformylation conditions in the presence of a hydroformylation catalyst to produce a controlled functional density polyaldehyde containing reactive carbon-carbon double bonds, and (b) contacting the polyaldehyde with a substituted or unsubstituted sterically hindered aliphatic or cycloaliphatic primary amine or a substituted or unsubstituted aromatic primary amine under reductive amination conditions in the presence of an alkali metal borohydride to produce the poly(secondary amine) having a substantially equivalent ratio of secondary amine groups to reactive carbon-carbon double bonds as the ratio of aldehyde groups to reactive carbon-carbon double bonds in the polyaldehyde.

According to the process of the second embodiment of the invention, the polyaldehyde can optionally be recovered prior to the reductive amination.

The poly(secondary amines) made according to this invention are readily recoverable and well suited for use in rubber chemicals, urethane/urea materials, coatings, adhesives, sealants and construction of three-dimensional networks through bonds not available to tertiary amines.

A third embodiment of the invention relates to poly(secondary amines) comprising repeating units

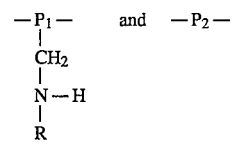

wherein $P_1$ represents the repeating unit of a polymer containing olefinic unsaturation which as been hydroformylated and reductively aminated, $P_2$ represents the repeating unit of the same polymer containing olefinic unsaturation having reactive carbon-carbon double bonds, R is selected from the group consisting of aliphatic, aromatic, cycloaliphatic, substituted aliphatic, aromatic and cycloaliphatic groups and combinations thereof, and the ratio of $P_1$ to $P_2$ is about 1:99 to about 90:10.

The substituent of the substituted aliphatic, aromatic and cycloaliphatic groups is selected from the group consisting of

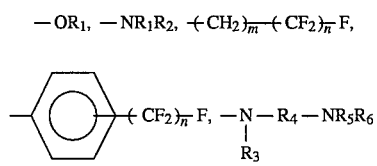

and mixtures thereof wherein $R_1$, $R_2$, $R_3$, $R_5$ and $R_6$ are independently selected from the group consisting of hydrogen, aliphatic groups, aromatic groups and cycloaliphatic groups, $R_4$ is selected from the group consisting of aliphatic, aromatic and cycloaliphatic groups, m is an integer from 0 to 4 and n is an integer from 1 to 7.

The poly(secondary amines) prepared according to the present invention contain essentially no repeating units of the formula:

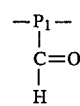

i.e., essentially all of the aldehyde groups in the polyaldehyde are converted to secondary amine groups during the reductive amination. In addition, the poly(secondary amines) prepared according to the present invention contain essentially no repeating units of the formula:

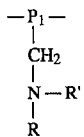

wherein R' is selected from the group consisting of aliphatic, aromatic, cycloaliphatic, substituted aliphatic, aromatic and cycloaliphatic groups and combinations thereof, i.e., the poly(secondary amines) contain essentially no tertiary amine groups.

HYDROFORMYLATION

In accordance with the present invention, the poly(secondary amines) are prepared from aldehyde-functionalized polymers obtained by hydroformylating a polymer containing olefinic unsaturation.

The polymers containing olefinic unsaturation useful in the process of the present invention can be homopolymers formed from $C_4$ to $C_{10}$ monomers having multiple carbon-carbon double bonds therein, such as, for example, butadiene, isoprene, cyclopentadiene, dimers of cyclopentadiene, 1,3-pentadiene, 1,4-pentadiene, 1,3-hexadiene, 1,4-hexadiene, 1,5-hexadiene, 2,4-hexadiene, 1,3,5-hexatriene and the like. The polymer containing olefinic unsaturation used in the present invention may be in any of their isomeric stereoconfigurations. In the case of polybutadiene, for example, it can be in its cis-1,4-, trans-1,4-, or trans -1,2- configuration or a mixture thereof. Further, the polymers useful in the process of the invention may be copolymers formed from two or more monomer compounds which are each capable of forming a polymeric segment containing carbon-carbon double bonds therein, such as copolymers having polybutadiene segments as, for example, copolymers of poly(butadieneisoprene), poly(butadiene-1,4-pentadiene) and the like.

The polymers containing olefinic unsaturation useful in the process of the present invention can also be co-polymers formed from at least one monomer as described above capable of producing olefin containing polymer segments and at least one co-polymerizable vinyl monomer which does not form olefin containing polymer segments, such as acrylamides, acrylonitrile, styrene, acrylates, alkylvinyl ethers, alkylvinyl ketone and the like, and mixtures thereof, and $C_1$–$C_{20}$ hydrocarbyl derivatives of such monomers, such as α-methyl styrene, methyl acrylate and the like. Such materials are formed in conventional manners by free radical, cationic or anionic polymerization techniques, as are well-known. A large variety of these polymers can be readily obtained commercially, such as poly(butadiene-acrylonitrile), poly(butadiene-styrene), acrylonitrile-butadiene-styrene (ABS) resins, ethylene-propylene-diene (EPDM) polymers or the like. The polymers containing olefinic unsaturation can be formed with nonolefin containing monomer groups in any degree desired as long as the resultant polymer contains sufficient amounts of carbon-carbon double bonds therein to act as an active precursor of the desired polyaldehyde product.

The polymers containing olefinic unsaturation useful in the process of the invention can also be formed from olefinic monomers such as ethylene, propylene, 1-butene, 1-pentene, 1-hexene, 2-methyl-1-propene, 3-methyl-1-pentene, 4-methyl-1-pentene, 3,3-dimethyl- 1-butene, 2,4,4-trimethyl-1-pentene, 3-methyl- 1-hexene, 3-methyl-1-butene and the like which produce, through branching, isomerization and the like polymeric materials having residual carbon-carbon double bonds therein.

Suitable polymers containing olefinic unsaturation include homopolymers such as polyethylene, polypropylene, polybutene, polybutadiene and polyoctene; co-polymers of olefins such as poly(ethylenepropylene), poly(ethyleneoctene), poly(ethyleneisobutylene), poly(ethylene-1-butene), poly(ethylenehexene) and poly(propyleneoctene); copolymers of olefins and at least one copolymerizable mono-olefinic monomers, e.g., copolymers of two or more olefins and a diene monomer, such as poly(ethylenepropylenediene monomer) (EPDM), Poly(ethylenevinylacetate), poly(ethylenevinylalcohol), poly (ethyleneethyl acrylate), poly (propylenemethyl acrylate), copolymer of dienes and acrylonitrile such as a copolymer of butadiene and acrylonitrile; and the like.

Satisfactory diene monomers include straight chain (acyclic) dienes such as 1,4-hexadiene, 2-methyl- 2,4-pentadiene, 1,4,9-decatriene and 11-ethyl-1,11-tridecadiene; monocyclic dienes such as 1,5-cyclooctadiene, dienes such as 5-ethylidene norbornene (ENB), 5-methylene-2-norbornene, 5-isopropylidene-2-norbornene and 2-methyl-bicyclo-(2.2.1)-2,5-heptadiene; fused ring bicyclics such as bicyclo(4.3.0)-3,7-nonadienes, 5-methyl-bicyclo(4.3.0)-3,7-nonadiene, 5,6-dimethyl-bicyclo-( 4.3.0)-3,7-nonadiene and bicyclo(3.2.0)-2,6-heptadiene; alkenyl substituted monocyclics such as 4-vinyl-cyclohexene, 1,2-divinyl cyclobutane and 1,2,4-trivinylcyclohexane; and tricyclics such as dicyclopentadiene (DCPD). Grades of EPDM rubbers suitable for use in the practice of the invention are commercially available; Rubber World Blue Book 1975 Ed., *Materials and Compounding Ingredients for Rubber,* pp 406–410. Preferred EPDM rubbers are those marketed by Uniroyal Chemical Company, Inc., Middlebury, Conn. under the tradename Trilene®, such as Trilene® 66 and 67 (ENB diene monomer), Trilene® 55 and 65 (DCPD diene monomer) and the like. Other preferred EDPM rubbers include those wherein the diene monomer is 5-isopropylidene-2-norbornene. Although not specifically required, the ethylene and propylene ratio in such EPDM rubbers is preferably within a range of from about 40/60 to about 50/50.

The preferred polymers containing olefinic unsaturation useful in the present invention are polybutadienes and poly(ethylenepropylenediene monomer).

In order to undergo the hydroformylation reaction, the polymer containing olefin unsaturation must contain a level of unsaturation, i.e., as carbon-carbon double bond, which is the site where the syngas (carbon monoxide and hydrogen) will form the aldehyde (—CHO) group. This unsaturation can be present in the backbone of the polymer and/or in a pendant group thereof, e.g., as in EPDM polymers. Preferably the level of unsaturation in the polymer containing olefinic unsaturation will be in the range of from 1 carbon-carbon double bond per polymer chain (or molecule) up to about 1 carbon-carbon double bond per 4 carbon atoms. Procedures for determining the level of unsaturation of polymers are well known. For example, the level of unsaturation can be determined utilizing ASTM D-1638- 59T. The level of unsaturation can also be determined utilizing infrared spectroscopy or $^1$H NMR. This method can be conducted according to well known procedures as described in Willard et al, *Instrumental Methods of Analysis,* Chapters 5 and 6, Van Nostrand Co., Inc., Publishers (1965). Alternatively, well known titration methods can also be utilized. A preferred method for determining unsaturation levels is $^1$H NMR.

Suitable polymers containing olefinic unsaturation are those having a weight average molecular weight ($M_w$) of from about 300 to about 250,000, preferably about 600 to about 150,000, and most preferably about 1000 to about 15,000.

The polymer containing olefinic unsaturation is mixed with carbon monoxide and hydrogen, with the polymer in the melt phase or dissolved in an inert solvent. Where no solvent is utilized, the polymer is heated to the glass transition temperature ($T_g$) corresponding to the specific polymer and then the carbon monoxide and hydrogen are added thereto and mixed. Where an inert solvent is utilized, the polymer is dissolved in the solvent and then the carbon monoxide and hydrogen are added and mixed. Suitable inert solvents for dissolving the polymer include toluene.

The hydrogen and carbon monoxide are contacted with the polymer in a hydrogen to carbon monoxide molar ratio of about 1:3 to about 3:1, preferably about 1:2 to about 2:1, and most preferably about 1:1. Throughout the course of the reaction, the presence of hydrogen and carbon monoxide is preferably essentially maintained at the initial molar ratio.

Following addition of carbon monoxide and hydrogen, a suitable catalyst is added to the mixture. Alternatively, the catalyst can be contacted with polymer prior to addition of the hydrogen and carbon monoxide. Suitable catalysts for hydroformylating the polymer containing olefinic unsaturation include, but are not limited to, Group VIII metal catalysts. The preferred Group VIII metal is rhodium I. Examples of suitable rhodium I catalysts include dicarbonyl acetylacetonate rhodium I (Rh(CO)$_2$AcAc), cyclooctadiene trifluoroacetyl rhodium I dimer ([Rh(COD) (O$_2$CCF$_3$)])$_2$, RhH(CO) (PPh$_3$)$_3$, and the like. Preferred hydroformylation catalysts are Rh(CO)$_2$AcAc and RhH(CO)(PPh$_3$)$_3$.

The hydroformylation reaction is conducted under a carbon monoxide/hydrogen atmosphere. The pressure of carbon monoxide/hydrogen during the hydroformylation reaction is about 50 psig to about 1000 psig, preferably about 200 psig to about 1000 psig. The temperature of the hydroformylation reaction is about 25° C. to about 200° C., preferably about 50° C. to about 150° C., and most preferably about 80° C. to about 120° C. The functional density of the polyaldehyde produced during the hydroformylation reaction will vary depending on the amounts of carbon monoxide and hydrogen relative to the degree of unsaturation existing in the starting polymer containing olefinic unsaturation. The functional density of the polyaldehydes is controlled by measuring the carbon monoxide/hydrogen gas uptake during the hydroformylation reaction. In this way the amount of aldehyde groups placed on the polymer containing olefinic unsaturation can be measured and controlled. When the desired functional density is achieved, the reaction can be stopped.

The hydroformylation catalysts, particularly the rhodium I catalysts, are utilized in the hydroformylation reaction at levels of less than about 200 parts of catalyst based on metal rhodium per 106 parts of polymer containing olefinic unsaturation. Thus, the hydroformylation reaction can be conducted economically, i.e., at low catalyst cost, and at relatively mild conditions.

The process of the present invention provides the ability to control functional density of the polyaldehyde from about 1 mole percent to about 90 mole percent wherein functional density is the mole percent of carbon-carbon double bonds in the polymer containing olefinic unsaturation which are hydroformylated to aldehyde groups. Although the process of the invention allows the functional density of the polyaldehyde to be controlled anywhere within the above range, it is preferable to have a functional density within the range of about 10 mole percent to about 85 mole percent.

In the embodiment wherein the polyaldehyde is recovered, the recovery can be by any conventional recovery method. For example, when the hydroformylation reaction is conducted in the presence of a solvent, e.g., toluene, the amount of solvent in the reaction mixture can be reduced and the polyaldehyde precipitated by slow addition of methanol while stirring the mixture. The polymer can then be recovered, redissolved in the original solvent and precipitated again with methanol. The purified polyaldehyde can then be recovered.

REDUCTIVE AMINATION

Reductive amination is conducted by reacting the above-described polyaldehyde with a primary amine and hydrogen in a suitable solvent in the presence of a ruthenium-containing imine hydrogenation catalyst or by reacting the above-described polyaldehyde with a sterically hindered aliphatic primary amine or an aromatic primary amine in the presence of an alkali metal borohydride. The poly(secondary amines) prepared according to the process of the invention have a substantially equivalent ratio of secondary amine groups to reactive carbon-carbon double bonds as the ratio of aldehyde groups to reactive carbon-carbon double bonds in the polyaldehyde.

The poly(secondary amine) functional density will depend on the polyaldehyde functional density. Thus, the functional density of the poly(secondary amine) can be readily controlled within the range of about 1 mole percent to about 90 mole percent wherein functional density is based on the level of carbon-carbon double bonds in the polymer containing olefinic unsaturation. Thus, the poly(secondary amine) functional density can range anywhere within the range of about 1 mole percent to about 90 mole percent, such as from 10 mole percent to about 85 mole percent depending on the particular functional density desired for the end-use application of the poly(secondary amine).

Suitable amines for use in the process of the invention utilizing the ruthenium-containing imine hydrogenation catalyst are primary amines including, but not limited to, primary amines selected from the group consisting of aliphatic, aromatic, cycloaliphatic, substituted aliphatic, aromatic and cycloaliphatic primary amines and mixtures thereof. In the case of substituted aliphatic, aromatic and cycloaliphatic primary amines, the substituent on the aliphatic, cycloaliphtic or aromatic group of the substituted primary amine is selected from the group consisting of

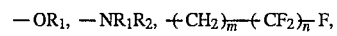

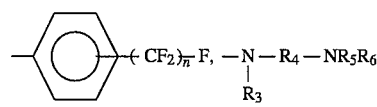

and mixtures thereof wherein $R_1$, $R_2$, $R_3$, $P_5$ and $R_6$ are independently selected from the group consisting of hydrogen, aliphatic groups, aromatic groups and cycloaliphatic groups, $R_4$ is selected from the group consisting of aliphatic, aromatic and cycloaliphatic groups, m is an integer from 0 to 4 and n is an integer from 1 to 7. When a substituted primary amine is used in the process of the invention, the preferred substituent is selected from the group consisting of —$OR_1$ and —$NR_1R_2$, and the most preferred substituent is —$NR_1R_2$ wherein one of $R_1$ and $R_2$ is hydrogen and the other of $R_1$ and $R_2$ is an aliphatic or cycloaliphatic group.

Examples of suitable primary amines include methyl amine, ethyl amine, isopropyl amine, n-butyl amine, n-hexyl amine, n-octyl amine, 2-aminoheptane, cyclohexyl amine, cyclooctyl amine, aniline, benzyl amine, 2-aminoethanol, 4-amino-1-butanol, 2-amino-1-butanol, 6-amino-1-hexanol, 2-amino-1-methoxy propane, 4-amino phenol, 4-amino cyclohexanol, 4-aminobenzotrifluoride, N-isopropyl-4-aminophenyl amine, N-(2-butyl)-4-aminophenyl amine, N-methylisoamyl-4-aminophenyl amine, N-cyclohexyl-4-aminophenyl amine, N-octyl- 4-aminophenyl amine, 4-aminodiphenyl amine, N,N-dimethyl ethylene diamine, and the like, and mixtures thereof.

Suitable amines for use in the process of the invention utilizing an alkali metal borohydride are sterically hindered aliphatic or cycloaliphatic primary amines, aromatic primary amines, substituted sterically hindered aliphatic or cycloaliphatic and aromatic primary amines and mixtures thereof. In the case of substituted sterically hindered aliphatic or cycloaliphatic and aromatic primary amines, the substituent on the aliphatic, cycloaliphatic or aromatic groups are as defined above.

Examples of suitable sterically hindered aliphatic or cycloaliphatic amines include, but are not limited to, isopropyl amine, cyclohexyl amine, cyclooctyl amine, isobutyl amine, cyclopentylamine and mixtures thereof.

The amount of primary amine used in the process of the invention can be conveniently expressed in terms of a ratio of moles of primary amine to moles of —CHO in the polyaldehyde, i.e., the amount of primary amine will vary depending on the functional density of the polyaldehyde. Such molar ratio can vary from about 1:1 to about 30:1, preferably about 1:1 to about 20:1, and most preferably about 2:1 to about 10:1. The resulting polyamines contain functional groups wherein essentially all of the aldehyde groups are aminated.

The catalyst used in the reductive amination reaction will be a ruthenium-containing imine hydrogenation catalyst which does not hydrogenate the carbon-carbon double bonds during the reductive amination. The ruthenium-containing imine hydrogenation catalyst may take many different forms. For instance, the ruthenium may be added to the reaction mixture in an oxide form, as in the case of for example, ruthenium(IV) oxide hydrate, anhydrous ruthenium(IV) dioxide and ruthenium(VIII) tetraoxide. Alternatively, it may be added as the salt of a mineral acid, as in the case of ruthenium(III) chloride hydrate, ruthenium(III) bromide, ruthenium(III) iodide, tricarbonyl ruthenium(II) iodide, anhydrous ruthenium(III) chloride and ruthenium nitrate, or as the salt of a suitable organic carboxylic acid, for example, ruthenium(III) acetate, ruthenium naphthenate, ruthenium valerate and ruthenium complexes with carbonyl-containing ligands, such as ruthenium(III) acetylacetonate. The ruthenium may also be added to the reaction zone as a carbonyl or ruthenium carbonyl hydride derivative. Here, suitable examples include triruthenium dodecacarbonyl and other ruthenium carbonyl hydrides such as $H_2Ru_4(CO)_{13}$ and $H_4Ru_4(CO)_{12}$, and substituted carbonyl species such as the tricarbonylruthenium(II) chloride dimer, $[Ru(CO)_3Cl_2]_2$.

Preferred ruthenium-containing imine hydrogenation catalysts include oxides of ruthenium, ruthenium salts of an organic carboxylic acid and ruthenium carbonyl or ruthenium carbonyl hydride derivatives. Among these, particularly preferred are ruthenium(IV) dioxide hydrate, ruthenium tetraoxide, anhydrous ruthenium(IV) oxide, ruthenium acetate, ruthenium(III) acetylacetonate, and triruthenium dodecacarbonyl. The most preferred ruthenium-containing imine hydrogenation catalyst is triruthenium dodecacarbonyl ($Ru_3(CO)_{12}$).

The reductive amination is conducted under a hydrogen atmosphere when a ruthenium-containing imine hydrogenation catalyst is utilized. The reductive amination may optionally be conducted under a hydrogen and carbon monoxide atmosphere wherein the ratio of carbon monoxide to hydrogen is less than about 0.15:1, preferably less than about 0.1:1, and most preferably less than about 0.05:1. The pressure of hydrogen or hydrogen/carbon monoxide during the reductive amination is about 150 psig to about 1000 psig, preferably about 200 psig to about 1000 psig. The temperature of the reductive amination is from about 110° C. to about 200° C., preferably about 120° C. to about 150° C.

The alkali metal borohydrides used in the reductive amination are preferably sodium or lithium borohydrides, most preferably sodium borohydrides. Examples of suitable alkali metal borohydrides include, but are not limited to, $NaBH(O_2CCH_3)_3$, $NaBH_3CN$, $NaBH_4$, $LiBH_4$ and mixtures thereof. Currently preferred alkali metal borohydrides are $NaBH(O_2CCH_3)_3$ and $NaBH_3CN$ because of their effectiveness and good results obtained therewith.

The reductive amination is typically conducted in the presence of a suitable solvent system. Examples of suitable solvent systems include, but are not limited to, toluene, xylene, mixtures of dimethylformamide (DMF) with an alkane or a cycloalkane, such as DMF/cyclohexane, ethers such as tetrahydrofuran, chlorinated hydrocarbons such as dichloroethane, and the like, and mixtures thereof. The currently preferred solvent system when a ruthenium-containing imine hydrogenation catalyst is used is a mixture of DMF and cyclohexane. The currently preferred solvent system when an alkali metal borohydride is used is tetrahydrofuran.

The poly(secondary amines) prepared by the process of the invention can be recovered by any conventional recovery method. Examples such recovery methods can be found in the examples herein.

EXAMPLES

Example 1

This example demonstrates the preparation of an EPDM-based polyaldehyde.

A toluene solution of EPDM (ethylene-propylene-diene monomer) polymer (Trilene® 55 marketed by Uniroyal Chemical Co., Inc., Middlebury, Conn., having 5 double bonds per chain) was prepared by dissolving 300.05 g of EPDM polymer in 500 mL of toluene and then degassing the solution by bubbling with argon. In a separate flask, $Rh(CO)_2(AcAc)$ (75.3 mg, 0.292 mmol) (AcAc= acetylacetonate) was dissolved in 100 mL of toluene and the solution degassed by bubbling with argon. Both solutions were placed in a 2 L reactor. The solutions were degassed three times with nitrogen in the reactor and then heated to 100° C. under 5 psig of nitrogen. The reactor was then charged to 1000 psig with hydrogen/carbon monoxide (1:1 mole ratio). The extent of reaction was measured by gas uptake from a calibrated reservoir. In this way the amount of aldehyde groups placed on the polymer backbone could be measured and controlled. At the desired functional density, the reaction was stopped by quickly cooling the reactor and venting the hydrogen/carbon monoxide gas from the reactor. The polymer solution was then removed from the reactor. The amount of toluene solvent was reduced by rotary evaporation and the hydroformylated polymer was precipitated from the toluene solution by slow addition of methanol (500 mL) with stirring. The solvents were then decanted and the polymer redissolved with 500 mL of toluene and precipitated again with 500 mL of methanol. After decanting the solvents, residual methanol was removed from the polymer by rotary evaporation leaving a light amber toluene solution of purified polyaldehyde. The polyaldehyde was analyzed by $^1$H NMR and the extent of functionalization determined by comparing the integrals for the aldehyde groups and the residual olefin groups in the polymer. The aldehyde functional density of the polyaldehyde was 3.9 aldehyde groups/chain indicating that 78% of the available carbon-carbon double bonds had been hydroformylated.

Example 2

This example demonstrates the preparation of a polybutadiene-based polyaldehyde.

A toluene solution of polybutadiene polymer (LX-16 marketed by Revertex; aver. M.N. 8000, 12% vinyl, 8% cis and trans-1,4) was made by dissolving 100.00 gm of polybutadiene in 100 mL of toluene in a 300 mL Parr reactor. HRh(CO)(PPh$_3$)$_3$ (70 mg; 76.19 µmol) and PPh$_3$(3.0 gm; 0.011 mol; 150 equiv/Rh) were then added to the reactor and then the reactor was sealed. The solution was degassed with nitrogen three times in the reactor and then heated to 100° C. The reactor was then charged to 600 psig with 1:1 H$_2$/CO. The extent of reaction was measured by gas uptake from a calibrated reservoir. In this way the amount of aldehyde groups placed on the polymer backbone could be measured and controlled. At the desired functionality level, the reaction was stopped by quickly cooling the reactor and venting the H$_2$/CO gas from the reactor. The polymer solution was then removed from the reactor. The reaction mixture was diluted with 100 mL of toluene and then the hydroformylated polymer was precipitated from the toluene solution by slow addition of methanol (270 mL) with stirring. The solvents were then decanted and the polymer redissolved with 200 mL of toluene and precipitated again with 250 mL of methanol. This last procedure was repeated for a total of three precipitations. After decanting the solvents, 200 mL of toluene was added to the polymer solution and the residual methanol was removed from the polymer by rotary evaporation leaving a light amber toluene solution of purified polyaldehyde. The extent of functionalization could be determined by comparing the integrals for the aldehyde groups and the residual olefin groups on the polymer in the $^1$H nmr. $^1$H nmr revealed that 13.84% of the starting double bonds had been hydroformylated.

Example 3

This example demonstrates the preparation of poly(secondary amine) using the polyaldehyde prepared in Example 2.

A toluene solution of polybutadiene-based aldehyde (23.14 wt. % polymer) was placed in a round-bottom flask (43.22 g solution; 10 g polymer; 0.0238 moles —CHO). Most of the toluene was then removed on a rotary evaporator. The polymer was then dissolved in a dimethylformamide (DMF)/cyclohexane mixture (26 mL/22 mL) and added to a 100 mL Parr reactor. Three equivalents, based on moles of —CHO in the polyaldehyde, of isopropyl amine (6.1 mL) and 0.001 equivalents of triruthenium dodecacarbonyl (0.015 g) were added to the reactor. The reactor was sealed and purged twice with hydrogen/carbon monoxide (1:1 mole ratio) without stirring, then degassed three times with hydrogen/carbon monoxide (1:1 mole ratio) with stirring. The reactor was then charged to 60 psig with hydrogen/carbon monoxide (1:1 mole ratio) and then further pressurized to 600 psig with hydrogen. The reactor was then heated to 120° C. with stirring and allowed to react for 20 hours. The reaction mixture was then cooled to room temperature and vented. The reaction mixture was transferred to a separatory funnel and allowed to phase separate. The DMF layer was drained from the bottom and contained most of the ruthenium catalyst. The cyclohexane layer was washed three times with DMF (40 mL each). The cyclohexane was then removed on a rotary evaporator and the polymer dissolved in toluene. The poly(secondary amine) was analyzed by $^1$H NMR and the analysis of the polymer revealed that all aldehyde groups had been converted to isopropylaminomethyl groups.

Example 4

This example demonstrates the preparation of a polybutadiene based polyaldehyde having a 19% functional density.

A toluene solution of polybutadiene polymer (LX-16 marketed by Revertex; aver. M.N. 8000, 12% vinyl, 88% cis and trans-1,4) was made by dissolving 100.00 gm of polybutadiene in 100 mL of toluene in a 300 mL Parr reactor. HRh(CO) (PPh$_3$)$_3$ (70 mg; 76.19 µmol) and PPh$_3$ (3.0 gm; 0.011 mol; 150 equiv/Rh) were then added to the reactor and then the reactor was sealed. The solution was degassed with nitrogen three times in the reactor and then heated to 100° C. The reactor was then charged to 600 psig with 1:1H$_2$/CO. The extent of reaction was measured by gas uptake from a calibrated reservoir. At the desired functionality level, the reaction was stopped by quickly cooling the reactor and venting the H$_2$/CO gas from the reactor. The polymer solution was then removed from the reactor. The reaction mixture was diluted with 100 mL of toluene and then the hydroformylated polymer was precipitated from the toluene solution by slow addition of methanol (500 mL) with stirring. The solvents were then decanted and the polymer redissolved with 300 mL of toluene and precipitated again with 600 mL of methanol. After decanting the solvents, 200 mL of toluene was added to the polymer solution and the residual methanol was removed from the polymer by rotary evaporation leaving a light amber toluene solution of purified polyaldehyde. The extent of functionalization could be determined by comparing the integrals for the aldehyde groups and the residual olefin groups on the polymer in the $^1$H nmr. $_1$H nmr revealed that 19% of the starting double bonds had been hydroformylated.

Example 5

This example demonstrates the preparation of polybutadiene/methylamine based poly(secondary amine) utilizing the polyaldehyde prepared in Example 4.

Polyaldehyde (10 g) prepared from an 8000 M$_w$ polybutadiene in which 19% of the carbon-carbon double bonds had been hydroformylated was dissolved in 98 mL of DMF and 83 mL of cyclohexane in a 300 mL Parr reactor. Triruthenium dodecacarbonyl (0.02 g, 3.2×10$^{-5}$ moles) was added and the reactor closed and purged with nitrogen.

Methyl amine (20.9 g, 21.2 equivalents) was added to the reactor from an in-line reservoir and swept in with 170 psig of hydrogen/carbon monoxide. The reactor was then pressurized with hydrogen to 600 psig total pressure. The reactor was heated to 120° C. and allowed to react for about 18 hours. After cooling the reactor to ambient temperature, the product was isolated from the cyclohexane solvent layer and extracted with DMF. The poly(secondary amine) was analyzed using $^1$H NMR. The results indicated complete reaction of the aldehyde groups to the secondary amine groups.

Example 6

This example demonstrates the low pressure reductive amination of the polyaldehyde prepared according to Example 4.

Polyaldehyde (27.6 g), prepared from an 8000 $M_w$ polybutadiene in which 19% of the carbon-carbon double bonds had been hydroformylated, was dissolved in 72 mL of DMF and 61 mL of cyclohexane in a 300 mL Parr reactor. Triruthenium dodecacarbonyl (0.056 g, 8.8× $10^{-5}$ moles) and isopropyl amine (10.4 g, 2 equivalents) were added to the reactor and the reactor closed. The reactor was pressurized with 60 psig of hydrogen/carbon monoxide (1:1 mole ratio). The reactor was then pressurized with hydrogen to 90 psig total pressure. The reactor was heated to 120° C. During the heatup time it was noted that reaction began to occur after one hour at reactor conditions of 130 psig reactor pressure and 120° C. The reactor pressure was adjusted with hydrogen to about 200 psig and the reaction allowed to proceed for a total reaction time of 48 hours. After cooling the reactor to ambient temperature, the product was isolated from the cyclohexane solvent layer and extracted with DMF. The poly(secondary amine) was analyzed using $^1$H NMR. The results indicated complete reaction of the aldehyde groups to the desired isopropyl amine polymer.

This example demonstrates that the poly(secondary amines) can be prepared using a low pressure reductive amination.

Example 7

This example demonstrates the preparation of a poly(secondary amine) from the polyaldehyde prepared according to Example 4 using a low pressure reductive amination without the presence of carbon monoxide.

Polyaldehyde (27.6 g), prepared from an 8000 $M_w$ polybutadiene in which 19% of the carbon-carbon double bonds had been hydroformylated, was dissolved in 72 mL of DMF and 61 mL of cyclohexane in a 300 mL Parr reactor. Triruthenium dodecacarbonyl (0.056 g, 8.8× $10^{-5}$ moles), isopropyl amine (10.4 g, 2 equivalents) were added to the reactor, the reactor closed and purged with nitrogen. The reactor was then pressurized with hydrogen to 90 psig total pressure and the reactor heated to 120° C. During the heatup time it was noted that the reaction began to occur after one hour at reactor conditions of 130 psig reactor pressure and 120° C. The reactor pressure was adjusted with hydrogen to about 200 psig and the reaction allowed to proceed for a total reaction time of 49 hours. After cooling the reactor to ambient temperature, the product was isolated from the cyclohexane solvent layer and extracted with DMF. The poly(secondary amine) was analyzed by $^1$H and $^{13}$C NMR. The results indicated complete reaction of the aldehyde groups to the desired isopropyl amine groups.

This example demonstrates that the reductive amination can be conducted without the presence of carbon monoxide.

Example 8

This example demonstrates the preparation of the poly(secondary amine) based on polybutadiene containing 4-aminodiphenylamine (4-ADPA) secondary amine groups.

Polybutadiene (100 g) (Aldrich Cat. No. 20050-6, average $M_n$ 4500, 45% vinyl) was dissolved in 100 mL of toluene in a 300 mL Parr reactor. HRh(CO)(PPh$_3$)$_3$ (0.07 g, 7.6×$10^{-5}$ moles) and PPh$_3$(3.0 g, 1.14×$10^{-2}$ moles) were added and the reactor sealed and purged with nitrogen. The reactor was then heated to 100° C. and charged with 600 psig of syngas (hydrogen/carbon monoxide, 1:1 mole ratio). Gas uptake was monitored and the reaction was stopped at the desired conversion. Analysis using $^1$H NMR confirmed that 32% of the starting carbon-carbon double bonds had been hydroformylated. The reaction mixture was diluted with 100 mL of toluene and the polymer isolated by precipitating with 300 mL of methanol. The solvents were decanted and polymer was dissolved in toluene and precipitated with 300 mL of methanol. The solvents were decanted and polymer was dissolved in toluene and the remaining methanol and most of the toluene removed by rotary evaporation.

Polyaldehyde (33 g) was then dissolved in 87 mL of DMF and 73 mL of cyclohexane in a 300 mL Parr reactor. Triruthenium dodecacarbonyl (0.1 g, 1.66×$10^{-4}$ moles) and 4-ADPA (61.2 g, 2 equivalents per aldehyde group on the polymer) was added to the reaction mixture and the reactor sealed. The reactor was purged with syngas. The reactor was then pressurized with syngas to 60 psig and then with hydrogen to a total pressure of 600 psig. The reactor was then heated to 120° C. and allowed to react for 32 hours. The reaction was cooled and vented and the polymer was isolated by dripping the reaction mixture into 1 L of ethanol. The solvents were decanted and the polymer was dissolved in 200 mL of toluene and precipitated in 1L of ethanol and then the polymer was dissolved in toluene and the residual ethanol removed by rotary evaporation. Complete conversion of the polyaldehyde to polymer bound 4-ADPA was shown by comparing the integrations for the aryl protons from the 4-ADPA groups and the residual olefinic groups in the polymer backbone using $^1$H NMR. Comparison of the integrations indicated that 32% of the monomer units now contained 4-ADPA groups.

This example demonstrates that a selective conversion of polyaldehyde to poly(secondary amine) without competitive side reactions of the unreacted carbon-carbon double bonds in the polymer backbone (hydrogenation, hydroformylation or errant aminomethylation) or multiple alkylations of the primary amine (4-ADPA) during the reductive amination reactions. If the reactions were not selective, the ratios of 4-ADPA groups to unreacted carbon-carbon double bonds would not be the same as the ratio of aldehyde groups to unreacted carbon-carbon double bonds in the starting polyaldehyde.

Example 9

This example demonstrates the preparation of a poly(secondary amine) from a polybutadiene based polyaldehyde having a 19.6% functional density and butyl amine.

10 gms of a polymeric aldehyde made from an 8000 MW poly(butadiene) in which 19.6% of the double bonds had been hydroformylated was dissolved in 98 mL of DMF (dimethyl formamide) and 83 mL of cyclohexane in a 300 mL Parr reactor. Ru$_3$(CO)$_{12}$ (0.02 gm, 3.2×$10^{-5}$ moles) and n-Butyl amine (6.5 mL, 0.065 mol) was added and the reactor was closed and purged with H$_2$/CO three times without stirring and three times with stirring. 60 psig of H$_2$/CO was added to the reactor. The reactor was then pressurized with H$_2$ to 600 psig total pressure. The reactor was heated to 120° C. and allowed to react for about 18 hrs. After cooling the reactor to ambient temperature, the product was isolated from the cyclohexane solvent layer and extracted with DMF. $^1$H nmr of the product polymer showed complete reaction to the desired butyl amine polymer. By using deuterated acetic acid as an nmr solvent, the acetic acid salt of the amine groups are formed. The protons on the carbon adjacent to the nitrogen of the amine group are shifted downfield in the $^1$H nmr and an integration of these protons can be compared to the unreacted olefins in the polymer backbone to confirm the functional density of amine groups on the polymer. Comparison of the ammonium methylene protons to the unreacted olefins in the deuterated acetic acid $^1$H nmr shows 19.7% amine groups on the polymer. This is within experimental error of our original 19.6% aldehyde functional density, confirming a selective conversion of the aldehyde groups to secondary amine groups. This is also confirmed by elemental analysis of the product polymer: Theoretical C 84.04%; H 12.11%; N 3.86%; Found C 83.94, 84.00%; H 12.42, 12.32%; N 3.98, 3.94%. Had there been any significant side reactions to produce tertiary amines, both the $^1$H nmr and the elemental analysis results would have been skewed to show a lower functional density than the expected 19.6%.

This example demonstrates that the poly(secondary amines) prepared according to the invention contain essentially no tertiary amine repeating units. This example further demonstrates that the ratio of secondary amine groups to reactive carbon-carbon double bonds is substantially equivalent to the ratio of aldehyde groups to reactive carbon-carbon double bonds in the polyaldehyde.

Example 10

This example demonstrates the preparation of a poly(secondary amine) from a polybutadiene based polyaldehyde having a 19.6% functional density and isopropyl amine.

10 gms of a polymeric aldehyde made from an 8000 MW poly(butadiene) in which 19.6% of the double bonds had been hydroformylated was dissolved in 98 mL of DMF (dimethyl formamide) and 83 mL of cyclohexane in a 300 mL Parr reactor. Ru$_3$(CO)$_{12}$(0.02 gm, 3.2×10$^{-5}$ moles) and isopropyl amine (5.6 mL, 0.065 mol) were added, the reactor closed and purged with H$_2$/CO three times without stirring and three times with stirring. 60 psig of H$_2$/CO was added to the reactor. The reactor was then pressurized with H$_2$ to 600 psig total pressure. The reactor was heated to 120° C. and allowed to react for about 18 hrs. After cooling the reactor to ambient temperature, the product was isolated from the cyclohexane solvent layer and extracted with DMF. $^1$H nmr of the product polymer showed complete reaction to the desired isopropyl amine polymer. By using deuterated acetic acid as an nmr solvent, the acetic acid salt of the amine groups are formed. The protons on the carbon adjacent to the nitrogen of the amine group is the shifted downfield in the $^1$H nmr and an integration of these protons can be compared to the unreacted olefins in the polymer backbone to confirm the functional density of amine groups on the polymer. Comparison of the ammonium methine proton on the isopropyl group to the unreacted olefins in the deuterated acetic acid $^1$H nmr shows 21.5% amine groups on the polymer. Comparison of the ammonium methylene protons to the unreacted olefins in the deuterated acetic acid $^1$H nmr shows 21.3% amine groups on the polymer. This is within experimental error of our original 19.6% aldehyde functional density, confirming a selective conversion of the aldehyde groups to secondary amine groups. The one to one correspondence of the methine groups to methylene groups in the $^1$H nmr further verifies the high degree of secondary amine formation from the aldehyde precursor. Formation of tertiary amine would provide a two to one ratio of methylene to methine as the amine would be doubly alkylated. The high secondary amine selectivity is also confirmed by elemental analysis of the product polymer: Theoretical C 83.97%; H 12.02%; N 4.01%; Found C 83.86, 83.62%; H 12.00, 12.31%; N 4.09, 4.10%. Had there been any significant side reactions to produce tertiary amines, both the $^1$H nmr and the elemental analysis results would have been skewed to show a lower functional density than the expected 19.6%.

This example demonstrates that the poly(secondary amines) prepared according to the invention contain essentially no tertiary amine repeating units. This example further demonstrates that the ratio of secondary amine groups to reactive carbon-carbon double bonds is substantially equivalent to the ratio of aldehyde groups to reactive carbon-carbon double bonds in the polyaldehyde.

Example 11

This example demonstrates the preparation of a poly(secondary amine) from an EPDM based polyaldehyde prepared according to the method of Example 1 using an alkali metal borohydride.

A toluene solution of EPDM aldehyde (37.26 wt % polymer) was weighed out in a round bottom flask (27.35 gm solution; 10.19 gm polymer, 3.02—CHO/chain; 6.28 mmol—CHO, functional density=60%). Most of the toluene was then removed on a rotary evaporator. Polymer was redissolved in 100 mL of tetrahydrofuran (THF). The polymer solution was transferred to a 12 oz. Fisher-Porter glass reactor fitted with a stir bar. The bottle was closed and the solution was degassed by bubbling with Ar. Isopropyl amine (1.6 mL; 3 eq.; 0.0188 mol) was added to the reactor by syringe. The solution was stirred at room temperature for 30 minutes to form the imine. The solution was then cooled to 0° C. with an ice bath. The reactor was then opened and NaB(O$_2$CCH$_3$)$_3$H (2.0 gm; 9.42 mmol; 1.5 eq.) was added to the solution and washed in with a few mL of THF, taking care to minimize the time that the reactor is exposed to the air. The reactor was then closed and allowed to warm to room temperature while stirring. The solution was allowed to react for 3 hours.

The solution is then transferred to a 500 mL beaker. The polymer is precipitated by the slow addition of 5% aqueous NaHCO$_3$. The solvents were decanted. The neat polymer was washed with MeOH and then redissolved in 100 mL of THF. The polymer was precipitated with 5% aqueous NaHCO$_3$ and the solvents were decanted. The polymer was washed with MeOH and then redissolved in 10 mL of THF. All solvents were then removed by rotary evaporation and the polymer was completely dried by vacuum overnight. $^1$H nmr analysis of the polymer revealed that all aldehyde groups had been converted to isopropylaminomethyl groups.

That which is claimed is:

1. Poly(secondary amine) comprising repeating units of

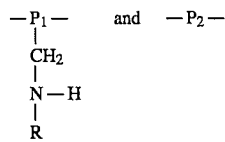

wherein $P_1$ represents the repeating unit of a polymer containing olefinic unsaturation which has been hydroformylated and reductively aminated, $P_2$ represents the repeating unit of the same polymer containing olefinic unsaturation having reactive carbon-carbon double bonds, R is selected from the group consisting of aliphatic, aromatic, cycloaliphatic, substituted aliphatic, aromatic and cycloaliphatic groups and combinations thereof, and the ratio of $P_1$ to $P_2$ is about 1:99 to about 90:10.

2. The poly(secondary amine) of claim 1 wherein the ratio of $P_1$ to $P_2$ is about 10:90 to about 85:15.

3. The poly(secondary amine) of claim 1 wherein the substituent of said substituted aliphatic, aromatic and cycloaliphatic groups is selected from the group consisting of

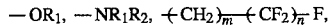

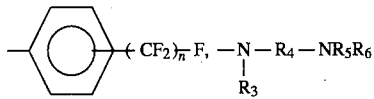

and mixtures thereof wherein $R_1$, $R_2$, $R_3$, $R_5$ and $R_6$ are independently selected from the group consisting of hydrogen, aliphatic groups, aromatic groups and cycloaliphatic groups, $R_4$ is selected from the group consisting of aliphatic, aromatic and cycloaliphatic groups, m is an integer from 0 to 4 and n is an integer from 1 to 7.

4. The poly(secondary amine) of claim 1 wherein said poly(secondary amine) contains essentially no repeating units of the formula

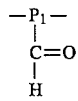

5. The poly(secondary amine) of claim 1 wherein said poly(secondary amine) contains essentially no repeating units of the formula:

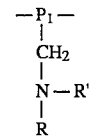

wherein R' is selected from the group consisting of aliphatic, aromatic, cycloaliphatic, substituted aliphatic, aromatic and cycloaliphatic groups, and combinations thereof.

6. Poly(secondary amine) prepared by the process comprising:
(a) contacting a polymer containing olefinic unsaturation with carbon monoxide and hydrogen under hydroformylation conditions in the presence of a hydroformylation catalyst to produce a controlled functional density polyaldehyde containing reactive carbon-carbon double bonds, and
(b) contacting said polyaldehyde with hydrogen and a primary amine under reductive amination conditions in the presence of a ruthenium-containing imine hydrogenation catalyst to produce said poly(secondary amine) having a substantially equivalent ratio of secondary amine groups to reactive carbon-carbon double bonds as the ratio of aldehyde groups to reactive Carbon-carbon double bonds in said polyaldehyde.

7. Poly(secondary amine) prepared by the process comprising:
(a) contacting a polymer selected from the group consisting of polybutadiene and poly(ethylenepropylenediene monomer) with carbon monoxide and hydrogen under hydroformylation conditions in the presence of a hydroformylation catalyst to produce a controlled functional density polyaldehyde containing reactive carbon-carbon double bonds, and
(b) contacting said polyaldehyde with hydrogen and a primary amine under reductive amination conditions in the presence of a ruthenium-containing imine hydrogenation catalyst to produce said poly(secondary amine) having a substantially equivalent ratio of secondary amine groups to reactive carbon-carbon double bonds as the ratio of aldehyde groups to reactive carbon-carbon double bonds in said polyaldehyde.

* * * * *